(12) United States Patent
Dmytriw et al.

(10) Patent No.: US 7,278,309 B2
(45) Date of Patent: Oct. 9, 2007

(54) INTERDIGITATED, FULL WHEATSTONE BRIDGE FLOW SENSOR TRANSDUCER

(75) Inventors: Anthony M. Dmytriw, Freeport, IL (US); Wayne T. Kilian, Richardson, TX (US); Jamie W. Speldrich, Freeport, IL (US); Scott Edward Beck, Murphy, TX (US); Gilberto Morales, Arlington, TX (US); Richard William Gehman, Hilliard, OH (US)

(73) Assignee: Honeywell International Inc., Morristown, NJ (US)

( * ) Notice: Subject to any disclaimer, the term of this patent is extended or adjusted under 35 U.S.C. 154(b) by 17 days.

(21) Appl. No.: 11/366,653

(22) Filed: Mar. 1, 2006

(65) Prior Publication Data

US 2007/0204688 A1   Sep. 6, 2007

(51) Int. Cl.
*G01F 1/68* (2006.01)
(52) U.S. Cl. .................................................. 73/204.26
(58) Field of Classification Search ...................... None
See application file for complete search history.

(56) References Cited

U.S. PATENT DOCUMENTS

| | | | |
|---|---|---|---|
| 4,651,564 A * | 3/1987 | Johnson et al. ........... 73/204.26 |
| 5,050,429 A | 9/1991 | Nishimoto et al. ...... 73/204.26 |
| 5,936,157 A * | 8/1999 | Yamashita et al. ........ 73/204.26 |
| 6,516,785 B1 * | 2/2003 | Nakada et al. .............. 123/494 |
| 6,557,411 B1 * | 5/2003 | Yamada et al. ........... 73/204.26 |
| 6,626,037 B1 * | 9/2003 | Wado et al. .............. 73/204.26 |
| 6,675,644 B2 * | 1/2004 | Yamakawa et al. ....... 73/204.26 |
| 6,889,545 B2 * | 5/2005 | Nakada et al. ............ 73/204.26 |
| 6,923,053 B2 * | 8/2005 | Yamada et al. ........... 73/204.26 |
| 7,010,971 B2 * | 3/2006 | Matsumoto et al. ...... 73/204.15 |

\* cited by examiner

*Primary Examiner*—Harshad Patel
(74) *Attorney, Agent, or Firm*—Kermit D. Lopez; Luiz M. Ortiz

(57) ABSTRACT

A sensor apparatus includes a heating element comprising an upstream side and a downstream side. A first heat sensing set is generally configured adjacent to the upstream side of the heating element and comprises a first sensing element and a second sensing element, the first and second sensing elements configured in a serpentine, interdigitated pattern. A second heat sensing set can be configured adjacent to the downstream side of the heating element and comprises a third sensing element and a fourth sensing element, the third and fourth sensing elements configured in a serpentine, interdigitated pattern.

19 Claims, 3 Drawing Sheets

INTERDIGITATED, FULL WHEATSTONE BRIDGE FLOW SENSOR TRANSDUCER

TECHNICAL FIELD

Embodiments are generally related to sensing devices and components thereof. Embodiments are also related to flow sensors. Embodiments are additionally related to an interdigitated, full Wheatstone bridge flow sensor transducer.

BACKGROUND OF THE INVENTION

Sensors are utilized in a variety of sensing applications, such as, for example, detecting and/or quantifying the composition of matter, detecting and/or quantifying the presence of a particular substance from among many substances, and detecting and/or quantifying a mass flow rate of a substance. The industrial, commercial, medical, and automotive industries in particular require many ways to quantify the amount of gaseous and liquid mass flow rates. For example, in the medical industry, an airflow sensor is often employed to monitor and/or control a patient's breathing. Two examples of this include sleep apnea devices and oxygen conserving devices. Similarly, airflow sensors are often employed in microcomputer cooling units to detect the presence and amount of local airflow in, through, and around the cooling units.

Historically, mass flow sensors have been constructed with one temperature-sensing resistor "upstream" and one temperature sensing resistor "downstream," where "upstream" and "downstream" generally indicate the direction of mass flow. One advancement in mass flow sensors in microchip environments, the "Wheatstone bridge" circuit, is often configured with external, off the chip, resistors. This historical configuration can be improved by implementing a full Wheatstone bridge, all four resistors, each a temperature sensing resistor, on the sensing chip, to allow for a larger signal to noise ratio and better immunity to ambient temperature noise.

Wheatstone bridges can be used to detect mass flow. For example, in a "full" Wheatstone bridge configuration, all four legs comprise variable resistors. In one configuration, resistive temperature detectors—resistors that vary in resistance with temperature—are used in each leg. A heating element situated between the two sides creates a roughly even thermal distribution about the heating element. As air, for example, passes from one side to the other side of the bridge, heat is conducted away from the "upstream" side to the "downstream" side, cooling the upstream side and heating the downstream side.

As the resistance of the two sides varies with temperature, the resultant temperature differential between the two sides causes a measurable voltage difference between the two sides. This voltage difference can be correlated to the difference in temperature. As the temperature change is a function of the air mass flow rate, the voltage difference can also be correlated to the mass flow rate.

However, previous full Wheatstone bridge configurations also often incur a low signal to noise ratio, particularly for very high or very low flow rates. A low signal to noise ratio reduces the accuracy and resolution of the bridge measurements and can cause difficulties in quantifying the mass flow rates under investigation.

Therefore, what is required is a system, apparatus, and/or method that provides an improved sensitivity to high and/or low flow rates that overcomes at least some of the limitations of previous systems and/or methods.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensing device.

It is a further aspect of the present invention to provide for a sensor with an improved signal to noise ratio.

It is a further aspect of the present invention to provide for a sensor with improved accuracy and resolution in quantifying mass flow rates.

The aforementioned aspects and other objectives and advantages can now be achieved as described herein. A sensor apparatus is disclosed that includes a heating element comprising an upstream side and a downstream side. A first heat sensing set can be configured adjacent to the upstream side of the heating element and comprises a first sensing element and a second sensing element, the first and second sensing elements configured in a serpentine, interdigitated pattern. A second heat sensing set is generally configured adjacent to the downstream side of the heating element and comprises a third sensing element and a fourth sensing element, the third and fourth sensing elements configured in a serpentine, interdigitated pattern.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
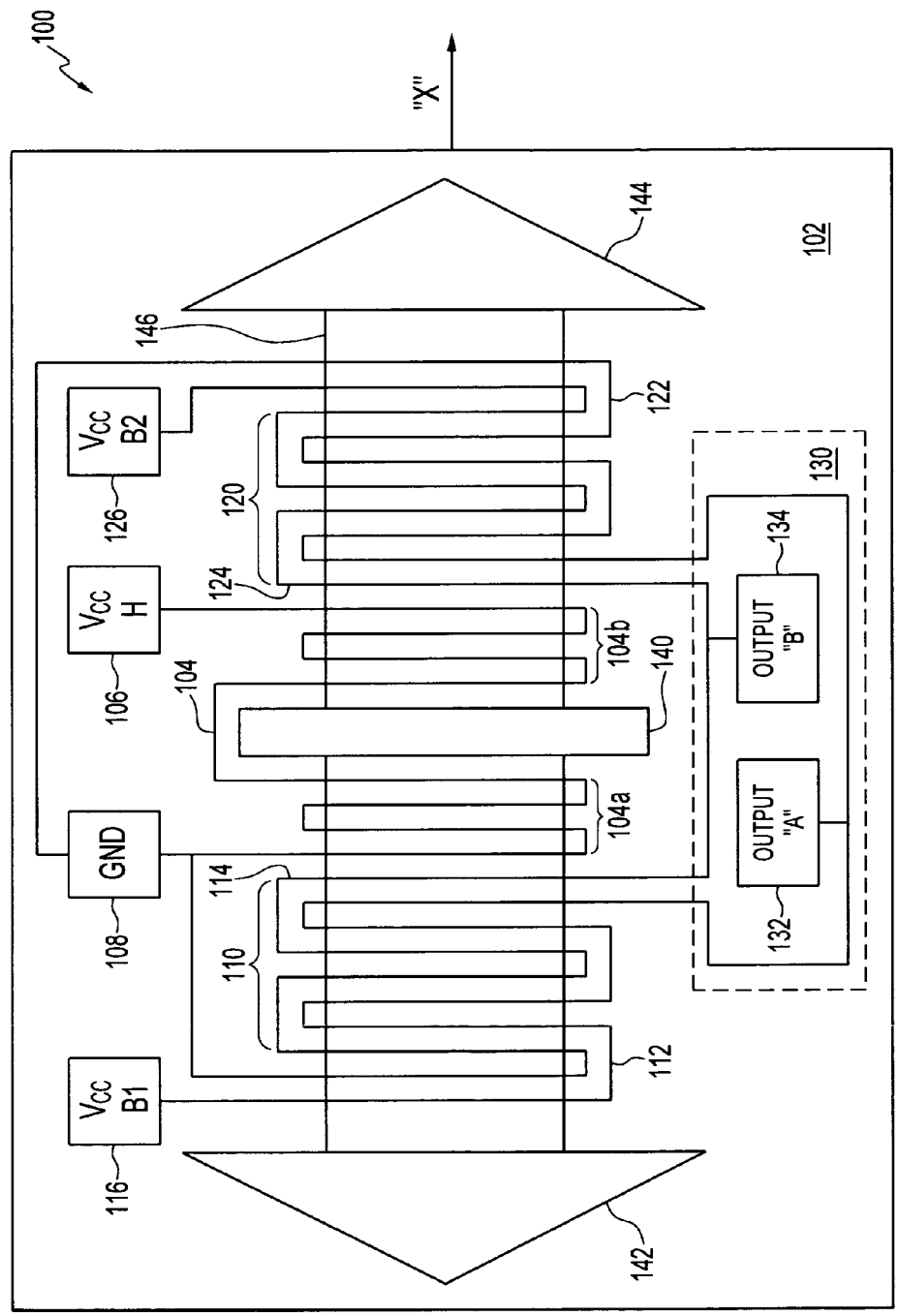
FIG. 1 illustrates an interdigitated, full Wheatstone bridge flow sensor apparatus in a block diagram, in accordance with a preferred embodiment.

FIG. 1 illustrates an improved sensing apparatus in accordance with one embodiment of the present invention. In particular, FIG. 1 is a block diagram illustrating a sensing system, generally indicated by reference numeral 100. As described in additional detail below, the present invention allows for a means of quantifying mass flow rates with a greater signal-to-noise ratio than current devices on the market, which, in turn, allows for an improvement in the accuracy and the resolution in quantifying mass flow rates.

In particular, in the illustrated embodiment, sensing system 100 includes a substrate 102, upon which the other components of sensing system are formed. One skilled in the art will understand that substrate 102 can be any suitable substrate, based in part on the composition of the remaining components of sensing system 100 and the environment in which sensing system 100 is employed. For example, in an embodiment where sensing system is employed in a microcomputer environment, substrate 102 can be a silicon substrate and can comprise a section of a larger wafer upon which one or more electrical circuits can be formed.

Sensing system 100 includes a heating element 104. In the illustrated embodiment, heating element 104 is configured with an "upstream" side 104a and a "downstream" side 104b. For ease of illustration, the illustrated embodiment is described with respect to a mass flow generally in the direction of arrow, "X." One skilled in the art will understand that the illustrated embodiment also operates to sense and quantify mass flow in the opposite direction of "X." Accordingly, the upstream side 104a and downstream side 104b are so named and described herein with respect to mass flow in the direction of "X."

Heating element 104 is generally configured in a serpentine pattern overall and in each of upstream side 104a and downstream side 104b. In an alternate embodiment, heating element 104 can be configured in a simplified, single-turn pattern comprising a single 180-degree turn on the opposite side of sensing system 100 as Vcc B1 116, ground 108, Vcc H 106, and Vcc B2 126. That is, embodiments do not have to be configured in a serpentine pattern as indicated in the drawings. In the illustrated embodiment, heating element 104 can be configured to convert an applied voltage into heat, which is then radiated outward from heating element 104. Accordingly, in one embodiment, heating element 104 is a heating resistor. One skilled in the art will understand that other suitable heating elements can also be employed.

Heating element 104 can be coupled to a voltage source through a wire bonding pad, Vcc H 106, and ground 108. In the illustrated embodiment, Vcc H 106 is a wire bonding pad coupled to an otherwise conventional voltage source and can be configured to deliver a voltage to heating element 104 such that the heat radiated from heating element 104 meets a desired heat output signature. Alternatively, heating element 104 can be configured to radiate heat in a desired output signature in response to a fixed voltage supplied to Vcc H 106. In an alternate embodiment, heating element 104 can be configured to radiate heat in a variety of heat signatures in response to a variable voltage supplied to Vcc H 106, which can be manipulated in response to changing mass flow characteristics measured by sensing system 100. One skilled in the art will understand that other configurations can also be employed.

Sensing system 100 also includes a heat sensing set 110. Generally, heat sensing set 110 is configured in a serpentine pattern adjacent to upstream side 104a of heating element 104. In the illustrated embodiment, heat sensing set 110 includes a sensing element 112 interdigitated in a serpentine pattern with a sensing element 114. Sensing elements 112 and 114 are otherwise conventional sensing elements configured to vary in resistance in response to local temperature changes. In one embodiment, sensing elements 112 and 114 are resistive temperature detectors (RTDs). In an alternate embodiment, sensing elements 112 and 114 are thermistors. In the illustrated embodiment, sensing elements 112 and 114 are identical RTDs. In an alternate embodiment, sensing elements 112 and 114 can be configured with different ratings and/or thermal response curves. One skilled in the art will understand that other configurations can also be employed.

Sensing system 100 also includes a heat sensing set 120. Generally, heat sensing set 120 is configured in a serpentine pattern adjacent to downstream side 104b of heating element 104. In the illustrated embodiment, heat sensing set 120 includes a sensing element 122 interdigitated in a serpentine pattern with a sensing element 124. Sensing elements 122 and 124 are otherwise conventional sensing elements configured to vary in resistance in response to local temperature changes. In one embodiment, sensing elements 122 and 124 are resistive temperature detectors (RTDs). In an alternate embodiment, sensing elements 122 and 124 are thermistors. In the illustrated embodiment, sensing elements 122 and 124 are identical RTDs. In an alternate embodiment, sensing elements 122 and 124 can be configured with different ratings and/or thermal response curves. In another alternate embodiment, sensing elements 112, 114, 122, and 124 are identical RTDs. One skilled in the art will understand that other configurations can also be employed.

Together, sensing elements 112, 114, 122, and 124 are configured in a full Wheatstone bridge. Further, each of sensing elements 112, 114, 122, and 124 comprise a leg of the Wheatstone bridge. Thus, sensing element 112 is coupled to sensing element 122 through output block 130. Sensing element 114 is also coupled to sensing element 124 through output block 130.

In the illustrated embodiment, output block 130 includes output "A" 132 and output "B" 134. Generally, output "A" 132 and output "B" 134 provide the differential voltage signal produced by the mass flow over the chip.

In the illustrated embodiment, sensing element 112 is coupled to a voltage source through a wire bonding pad, Vcc B1 116, and sensing element 124 is coupled to a voltage source through a wire bonding pad, Vcc B2 126. Vcc B1 116 and Vcc B2 126 are otherwise conventional wire bonding pads that are coupled to otherwise conventional voltage sources and are configured to provide a stable voltage across sensing elements 112 and 122 along with sensing elements 124 and 114, respectively. In one embodiment, Vcc B1 116 and Vcc B2 126 are configured to provide the same voltage. In an alternate embodiment, Vcc B1 116 and Vcc B2 126 are configured to provide different stable voltages. In an alternate embodiment, Vcc B1 116 and/or Vcc B2 126 are configured to provide varying voltages in response to operating conditions, control signals, and/or changes in the mass flow rate under investigation by sensing system 100. One skilled in the art will understand that other configurations can also be employed.

Additionally, sensing element 114 and sensing element 124 are also coupled to ground 108. In the illustrated embodiment, heating element 104, sensing element 114 of heat sensing set 110, and sensing element 124 of heat sensing set 120 are coupled to a common ground 108. One skilled in the art will understand that one or more of heating element 104, heat sensing set 110, and/or heat sensing set 120 can also be coupled to a separate ground.

In the illustrated embodiment, sensing system 100 also includes a plurality of thermal isolation barriers. Generally, thermal isolation barriers are configured to buffer or completely isolate one section of sensing system 100 from heat transfer from another section of sensing system 100. Thermal isolation barriers can be configured as positive barriers or negative barriers. Generally, a positive barrier is a thermal isolation barrier constructed from insulating materials and a negative barrier is a thermal isolation barrier formed by removing a section of substrate 102 to prevent direct conduction of heat across components.

In particular, sensing system 100 includes thermal isolation barrier 140, interposed between upstream side 104a and downstream side 104b of heating element 104. In the illustrated embodiment thermal isolation barrier 140 is a negative barrier formed through etching substrate 102. Sensing system 100 also includes a thermal isolation barrier 142 configured adjacent to heat sensing set 110, opposite upstream side 104a. Sensing system 100 also includes a thermal isolation barrier 144 configured adjacent to heat sensing set 120, opposite downstream side 104b. In the illustrated embodiment, thermal isolation barriers 142 and 144 are negative barriers formed through etching substrate 102. Sensing system 100 also includes a thermal isolation barrier 146 interposed between substrate 102 and heat sensing set 110, heating element 104, thermal isolation barrier 140, and heat sensing set 120. In the illustrated embodiment, thermal isolation barrier 146 is a negative barrier formed through etching substrate 102. In an alternate embodiment, thermal isolation barriers 140, 142, 144, and 146 are all formed as part of the same etch, or removal of material from substrate 102, to create thermal isolation and suspend heat sensing sets 110 and 120 and heating element 104.

Generally, in operation, sensing system 100 is configured as follows. A voltage source is applied to wire bonding pad, Vcc H 106, which applies a voltage to heating element 104. Heating element 104 radiates heat in response to the applied voltage, creating a region of roughly symmetrical thermal distribution expanding axially in all directions from upstream side 104a and downstream side 104b of heating element 104.

A voltage source is applied to wire bonding pad, Vcc B1 116, which applies a voltage across the sensing elements 112 and 122 of heat sensing sets 110 and 120, respectively. A voltage source is applied to wire bonding pad, Vcc B2 126, which applies a voltage across the sensing elements 124 and 114 of heat sensing sets 120 and 110, respectively. Output wire bonding pad "A" 132 and output wire bonding pad "B" 134 together provide the differential voltage signal. In one embodiment, the resistances are a function of the voltage change across heat sensing sets 110 and 120. One skilled in the art will understand that other configurations can also be employed.

In the absence of mass flow across sensing system 100, the local temperatures at heat sensing set 110 and heat sensing set 120 are the same. Thus, the resistances and voltage changes of and across heat sensing sets 110 and 120 are the same. As described above, mass flow across sensing system 100 produces a difference in the local temperatures at heat sensing set 110 and 120, and, therefore, substantially identical local temperatures indicates no mass flow across sensing system 100.

Where mass flows across sensing system 100, such as, for example, gaseous mass flow, the local temperatures at heat sensing set 110 and 120 diverge. In particular, when mass flow is generally in the direction of "X", heat is removed from the upstream side of sensing system 100 and transferred, through convection, to the downstream side of sensing system 100. That is, heat sensing set 110 is cooled and heat sensing set 120 is heated.

As output "A" 132 and output "B" 134 are configured to continuously measure and compare the resistances of (and/or voltage change across) heat sensing sets 110 and 120, the two outputs together detect the presence and rate of mass flow across sensing system 100. One skilled in the art will understand that because heating element 104 provides a constant source of heat, a constant local temperature differential between heat sensing sets 110 and 120 indicates a constant mass flow rate across sensing system 100. As the mass flow rate changes, the local temperature differential between heat sensing sets 110 and 120 changes, and is quantified as described above.

As described above, heat sensing set 110 includes sensing element 112 and 114 configured in an interdigitated, serpentine pattern. As such, the local temperature at sensing element 112 and sensing element 114 is substantially identical. The serpentine pattern provides consistent measurement across a single sensing element. Moreover, the interdigitated configuration increases the consistency of measurement between the sensing elements. Accordingly, the signal-to-noise ratio of measurements taken through sensing elements 112 and 114 is improved. Furthermore, as sensing elements 122 and 124 are also configured in an interdigitated, serpentine pattern, the signal-to-noise ratio of measurements taken through sensing elements 122 and 124 is also improved. Thus, sensing system 100 overall exhibits an improved accuracy and reliability in measuring mass flow rates.

Thus, generally, in one embodiment, sensing system 100 provides, on a single microchip, a set of two resistive temperature detectors (RTDs) on each side of a heating resistor. Both sets of RTDs are, individually, interdigitated (or interweaved) in a serpentine configuration and together allow for a full Wheatstone bridge sensing configuration. So configured, sensing system 100 provides an improved mass flow sensor with better signal-to-noise ratios than prior art systems and methods.

Figure 2:
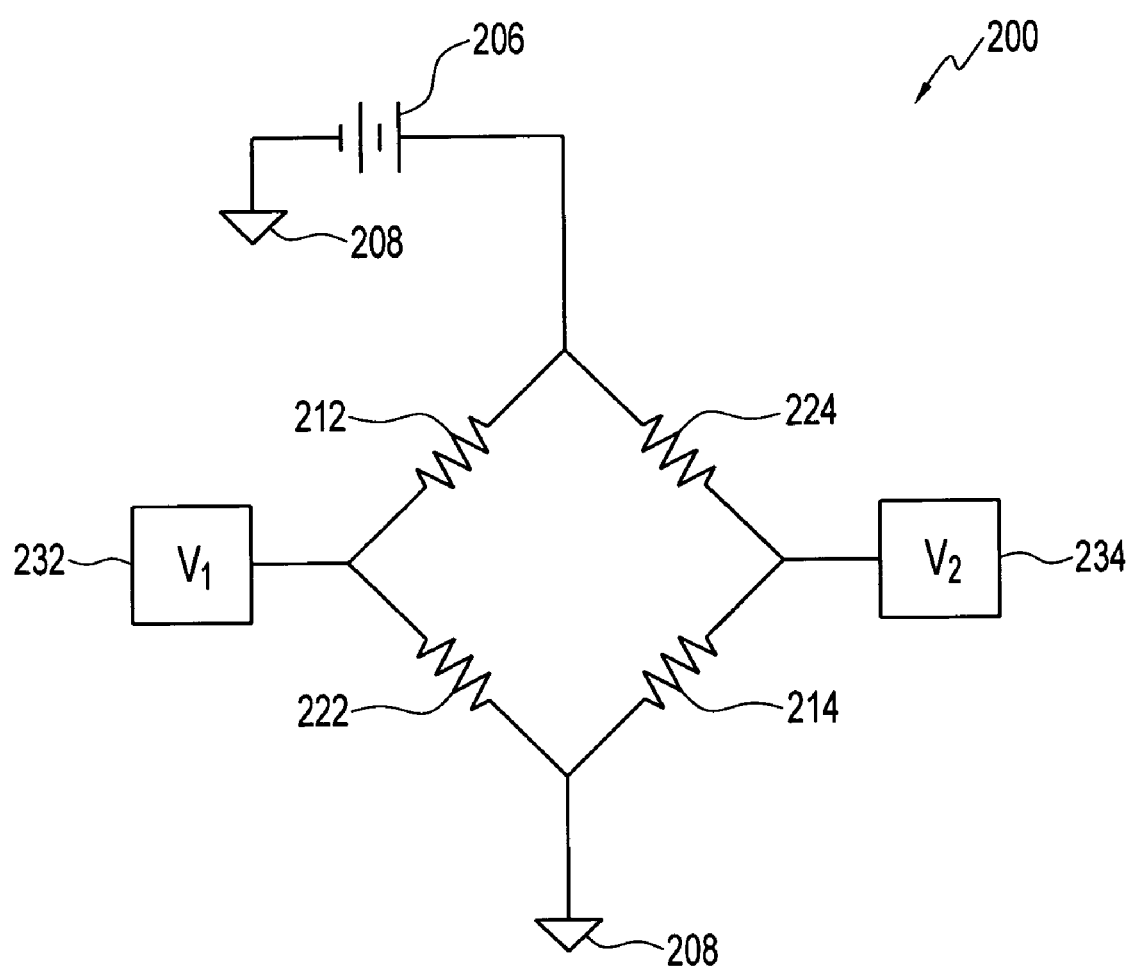
FIG. 2 illustrates a full Wheatstone bridge in a simplified circuit diagram, in accordance with a preferred embodiment.

In order to illustrate certain details of the full Wheatstone bridge configuration embodied in the above exemplary embodiment, reference is now made to FIG. 2. In particular, FIG. 2 is a circuit diagram illustrating a Wheatstone bridge, generally designated by the reference numeral 200. Bridge 200 includes voltage source 206 coupled to ground 208. In the illustrated embodiment, voltage source 206 corresponds to one or both of the voltage sources coupled to wire bonding pads Vcc B1 116 and Vcc B2 126 of FIG. 1.

Voltage source 206 couples to first leg 212. In the illustrated embodiment, first leg 212 corresponds to sensing element 112 of FIG. 1. Voltage source 206 also couples to third leg 224. In the illustrated embodiment, third leg 224 corresponds to sensing element 124 of FIG. 1.

First leg 212 couples to second leg 222 and output 232. In the illustrated embodiment, second leg 222 corresponds to sensing element 122 and output 232 corresponds to output "A" 132 of FIG. 1. Third leg 224 couples to fourth leg 214 and output 234. In the illustrated embodiment, fourth leg 214 corresponds to sensing element 114 and output 234 corresponds to output "B" 124 of FIG. 1. Second leg 222 and fourth leg 214 couple to ground 208.

One skilled in the art will understand that so configured bridge 200 operates as a full Wheatstone bridge, operable to detect and measure changes in resistance of and/or voltage across the legs 212, 214, 222, and 224. In particular, in the illustrated embodiment, output 232 is configured to measure a voltage, V1, and output 234 is configured to measure a voltage, V2. As described above, comparing the two voltages can be correlated to a local temperature differential, which, in turn, corresponds to a mass flow rate across bridge 200.

Figure 3:
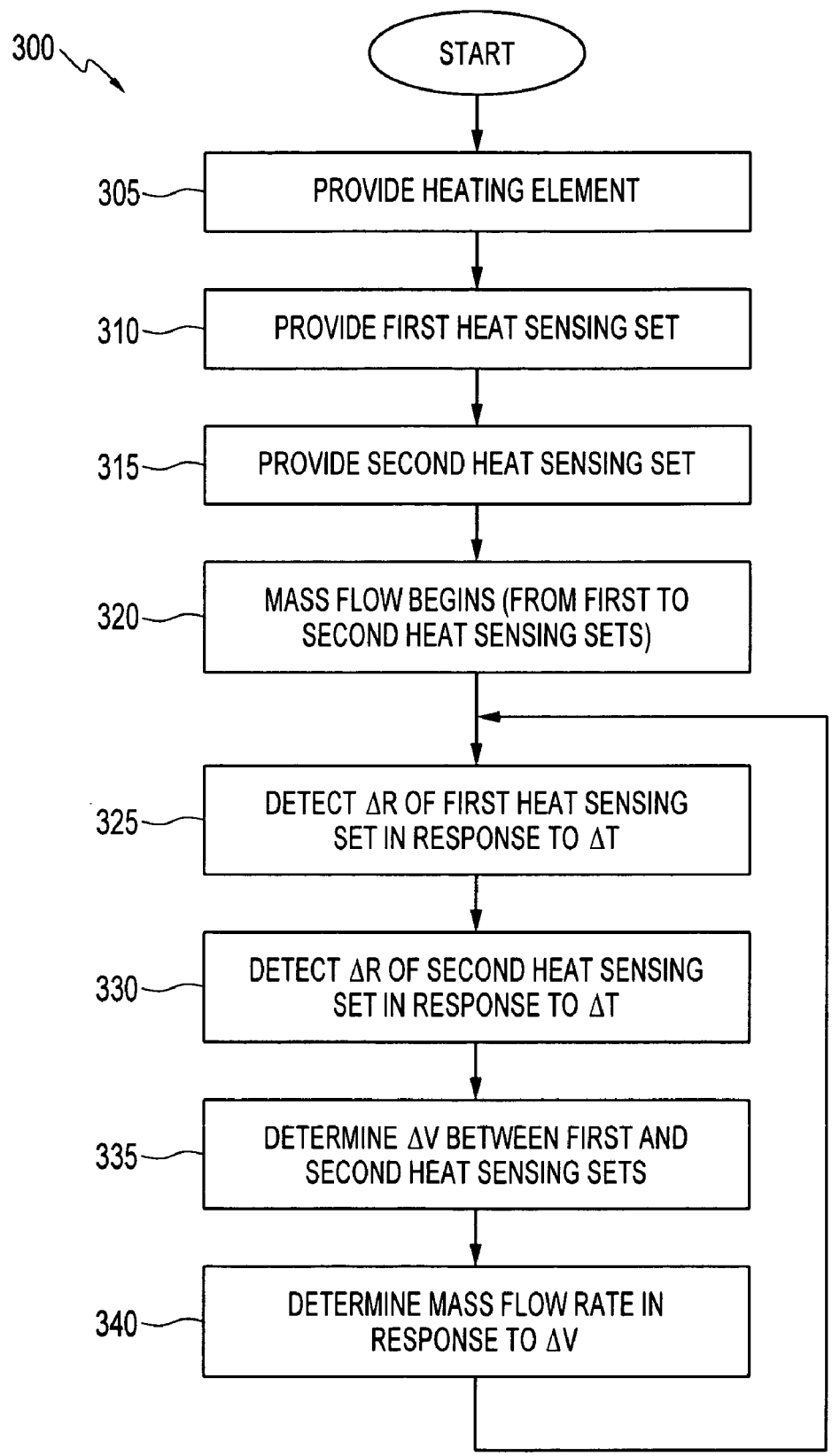
FIG. 3 illustrates in a flow diagram depicting logical operational steps of a method for sensing mass flow, in accordance with a preferred embodiment.

FIG. 3 illustrates a flow diagram 300 that depicts logical operational steps of a method for sensing mass flow. As indicated at block 305, the process begins, wherein a heating element is provided. This operation can be performed by, for example, heating element 104 of FIG. 1. As indicated next at block 310, a first heat sensing set is provided. The operation depicted at block 310 can be performed by, for example, heat sensing set 110 of FIG. 1. As described above, the first heat sensing set comprises at least two interdigitated sensing elements in a serpentine pattern.

As described thereafter at block 315, a second heat sensing set is provided. This operation can be performed by, for example, heat sensing set 120 of FIG. 1. As described above, the second heat sensing set comprises at least two interdigitated sensing elements in a serpentine pattern. Next, as illustrated at block 320, mass flow begins. As described above, in the discussion herein, mass flow is assumed to occur generally in the direction from the first heat sensing set, across the heating element, to the second sensing set. For example, in one embodiment, mass flow generally travels in the direction of "X" as indicated in FIG. 1.

As indicated thereafter at block 325, a change in resistance of the first heat sensing set is detected in response to the local change in temperature caused by the mass flow. This operation can be performed by, for example, output "A" 132 of FIG. 1. Next, as depicted at block 330, a change in resistance of the second heat sensing set can be detected in response to the local change in temperature caused by the mass flow. The operation described at block 330 can be performed by, for example, output "B" 134 of FIG. 1. One skilled in the art will understand that the operations illustrated at blocks 325 and 330 can be modified to detect a change in voltage.

As depicted next at block 335, a voltage difference between the first heat sensing set and the second heat sensing set can be determined. The operation illustrated at block 335 can be performed by, for example, output "A" 132 and output "B" 134 of FIG. 1. Thereafter, as indicated at block 340, a mass flow rate is determined in response to the voltage difference determined as depicted at block 335. As described above, one skilled in the art will understand that the voltage difference in a full Wheatstone bridge correlates to the temperature differential across the bridge, which, in turn, is a function of the mass flow rate.

The process returns to the operation illustrated at block 325 to provide continuous monitoring, detection, and measurement of the mass flow rate, if any, across the heating element and first and second heat sensing sets. One skilled in the art will understand that mass flow rates can fluctuate, including a zero flow rate, and that the above configuration is operable to detect a zero flow rate.

Accordingly, the embodiments provide for a system, apparatus, and method for improved measurement of mass flow rates. In particular, the interdigitated sensing elements in a serpentine pattern provide improved signal-to-noise ratios and therefore, improved accuracy and reliability in sensing and measurement of mass flow rates.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A sensor apparatus, comprising:
   a heating element comprising an upstream side and a downstream side;
   a first heat sensing set configured adjacent to the upstream side of the heating element and comprising a first sensing element and a second sensing element, the first and second sensing elements configured in a serpentine, interdigitated pattern;
   a second heat sensing set configured adjacent to the downstream side of the heating element and comprising a third sensing element and a fourth sensing element, the third and fourth sensing elements configured in a serpentine, interdigitated pattern that provides for a consistent measurement across a single sensing element and wherein said serpentine, interdigitated pattern provides for an interdigitated configuration that increases the consistency of measurement between said first, second, third and fourth sensing elements; and
   a plurality of thermal isolation barriers configured adjacent to the first and second heat sensing sets, wherein the first sensing element is coupled to the third sensing element to form one half of a Wheatstone bridge and wherein the second sensing element is coupled to the fourth sensing element to form a second half of the Wheatstone bridge in order to thereby permit said sensor apparatus to quantify flow rate data with an enhanced signal-to-noise ratio, which in turn provides for an improvement in the accuracy and resolution of quantifying mass flow rates via said sensor apparatus.

2. The apparatus of claim 1 wherein the heating element comprises a heating resistor.

3. The apparatus of claim 2, wherein the heating resistor is configured in a serpentine pattern.

4. The apparatus of claim 1, wherein at least one of the first sensing element, second sensing element, third sensing element, and fourth sensing element is a resistive temperature detector (RTD).

5. The apparatus of claim 4, further comprising a thermal isolation barrier interposed between the upstream side and the downstream side of the heating element.

6. The apparatus of claim 4, wherein the sensor apparatus is coupled to a substrate and further comprising a thermal isolation barrier interposed between the sensor apparatus and the substrate.

7. The apparatus of claim 1, further comprising a first voltage source coupled to the first heat sensing set and a second voltage source coupled to the second heat sensing set.

8. The apparatus of claim 1, further comprising a voltage source coupled to the first heat sensing set and the second heat sensing set.

9. A system for sensing mass flow, comprising:
   a base configured to couple to a microchip;
   a heating element coupled to the base and configured in a serpentine pattern with an upstream side and a downstream side;
   a first heat sensing element coupled to the base and configured in a serpentine pattern adjacent to the upstream side of the heating element and further configured as a first leg of a Wheatstone bridge;
   a second heat sensing element coupled to the base and configured in a serpentine pattern interdigitated with the first heat sensing element and further configured as a second leg of a Wheatstone bridge;
   a third heat sensing element coupled to the base and configured in a serpentine pattern adjacent to the downstream side of the heating element and further configured as a third leg of a Wheatstone bridge; and
   a fourth heat sensing element coupled to the base and configured in a serpentine pattern interdigitated with the third heat sensing element and further configured as a fourth leg of a Wheatstone bridge in order to thereby permit said system to quantify flow rate data with an enhanced signal-to-noise ratio, which in turn provides for an improvement in the accuracy and resolution of quantifying mass flow rates via said system, wherein said serpentine pattern provides for a consistent measurement across a single sensing element and increases the consistency of measurement between said first, second, third and fourth sensing elements.

10. The system of claim 9, further comprising:
a first thermal isolation barrier interposed between the first and second heat sensing elements and the base; and
a second thermal isolation barrier interposed between the third and fourth heat sensing elements and the base.

11. The system of claim 9, further comprising a first wire bonding pad coupled to the first and second sensing elements and configured to couple to a voltage source and a second wire bonding pad coupled to the third and fourth sensing elements and configured to couple to a voltage source.

12. The system of claim 9, wherein the heating element comprises a heating resistor.

13. The system of claim 9, wherein the first, second, third, and fourth heat sensing elements each comprise a resistive thermal detector (RTD).

14. A method for sensing mass flow, comprising:
providing a heating element configured in a serpentine pattern and comprising an upstream side and a downstream side;
providing a first heat sensing set adjacent to the upstream side of the heating element configured as a first one-half of a Wheatstone bridge and comprising a first heat sensing element and a second heat sensing element configured in a serpentine, interdigitated pattern;
providing a second heat sensing set adjacent to the downstream side of the heating element configured as a second one-half of a Wheatstone bridge and comprising a third heat sensing element and a fourth heat sensing element configured in a serpentine, interdigitated pattern that provides for a consistent measurement across a single sensing element and wherein said serpentine, interdigitated pattern provides for an interdigitated configuration that increases the consistency of measurement between said first, second, third and fourth sensing elements;
measuring by the first heat sensing set a first temperature;
measuring by the second heat sensing set a second temperature; and
determining a mass flow rate in response to the first and second temperatures in order to thereby quantify flow rate data with an enhanced signal-to-noise ratio, which in turn provides for an improvement in the accuracy and resolution of quantifying mass flow rates.

15. The method of claim 14, further comprising providing a plurality of thermal isolation barriers configured adjacent to the first and second heat sensing sets.

16. The method of claim 14, further comprising providing a thermal isolation barrier interposed between the upstream side and the downstream side of the heating element.

17. The method of claim 14 wherein the steps of measuring by the first sensing set and measuring by the second sensing set comprises detecting a voltage associated with an ambient temperature.

18. The method of claim 14, further comprising providing a first voltage source coupled to the first heat sensing set and a second voltage source coupled to the second heat sensing set.

19. The method of claim 14, wherein the step of determining a mass flow rate comprises comparing the first temperature and the second temperature.

* * * * *